United States Patent
Lee (10) Patent No.: US 10,404,375 B2
(45) Date of Patent: Sep. 3, 2019

(54) METHOD AND APPARATUS FOR PROCESSING TRAFFIC IN OPTICAL TRANSPORT NETWORK

(71) Applicant: ELECTRONICS AND TELECOMMUNICATIONS RESEARCH INSTITUTE, Daejeon (KR)

(72) Inventor: Won Kyoung Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 394 days.

(21) Appl. No.: 15/015,480

(22) Filed: Feb. 4, 2016

(65) Prior Publication Data

US 2016/0226781 A1   Aug. 4, 2016

(30) Foreign Application Priority Data

Feb. 4, 2015   (KR) .................. 10-2015-0017174

(51) Int. Cl.
*H04B 10/27* (2013.01)
*H04J 3/16* (2006.01)
*H04Q 11/00* (2006.01)

(52) U.S. Cl.
CPC ............ *H04B 10/27* (2013.01); *H04J 3/1652* (2013.01); *H04Q 11/0066* (2013.01)

(58) Field of Classification Search
CPC ........ H04B 10/27; H04L 3/1652; H04J 3/1652
See application file for complete search history.

(56) References Cited

U.S. PATENT DOCUMENTS

| | | | |
|---|---|---|---|
| 7,139,271 B1* | 11/2006 | Parruck | H04L 12/5601 370/392 |
| 7,643,510 B2 | 1/2010 | Li et al. | |
| 8,155,520 B1 | 4/2012 | West et al. | |
| 8,824,505 B2 | 9/2014 | Dong et al. | |
| 2006/0153179 A1* | 7/2006 | Ho | H04L 12/5601 370/386 |
| 2009/0257751 A1* | 10/2009 | Sadananda | H04J 14/0227 398/83 |
| 2010/0142525 A1 | 6/2010 | Cho et al. | |
| 2012/0163812 A1 | 6/2012 | Youn et al. | |
| 2013/0336332 A1* | 12/2013 | Kwan | H04L 12/6418 370/412 |
| 2016/0006580 A1* | 1/2016 | Lamb | H04L 12/467 370/254 |

* cited by examiner

*Primary Examiner* — Michael Thier
*Assistant Examiner* — Zhensheng Zhang
(74) *Attorney, Agent, or Firm* — Ladas & Parry LLP

(57) ABSTRACT

A method of processing traffic in an optical transport network (OTN) is provided. The method includes generating an optical channel data unit-k (ODUk) packet including, in a user overhead field, at least one of a number of packets included in an ODUk stream and a code number encoding a packet size, and transmitting the generated ODUk packet to a receiving framer.

10 Claims, 6 Drawing Sheets

FIG. 6

METHOD AND APPARATUS FOR PROCESSING TRAFFIC IN OPTICAL TRANSPORT NETWORK

CROSS-REFERENCE TO RELATED APPLICATION

This application claims the priority benefit of Korean Patent Application No. 10-2015-0017174, filed on Feb. 4, 2015, in the Korean Intellectual Property Office, the disclosure of which is incorporated herein by reference.

BACKGROUND

1. Field of the Invention

Embodiments relate to technology for processing traffic in an optical transport network (OTN) which may be used to transmit OTN traffic through a cell-based integrated fabric supporting packet switching and OTN switching simultaneously.

2. Description of the Related Art

Current service providers may require a packet-optical transport system (P-OTS) in which a packet switching function and an optical transport network (OTN) switching function are combined.

The P-OTS indicates technology that enables large-capacity OTN switching in addition to packet switching such as Ethernet and multiprotocol label switching-transport profile (MPLS-TP), and may be effective in terms of costs compared to related technology for synchronous optical network (SONET)/synchronous digital hierarchy (SDH) based packet transmission. In addition, the P-OTS may perform transmission through effective traffic grooming from client traffic to OTN traffic of various bandwidths based on a speed of the client traffic.

In a next-generation transmission network, such a P-OTS has been developed to use a packet or cell based (packet/cell) integrated fabric that may simultaneously switch a packet and time division multiplex (TDM) traffic. However, the packet/cell integrated fabric may not be suitable for OTN traffic switching because transmission delay or a traffic loss in an existing packet/cell fabric may affect performances, for example, a jitter and an OTN fault.

SUMMARY

According to an aspect, there is provided a method of processing traffic in an optical transport network (OTN), the method including generating an optical channel data unit-k (ODUk) packet including, in a user overhead field, at least one of a number of packets included in an ODUk stream and a code number encoding a packet size, and transmitting the generated ODUk packet to a receiving framer.

The receiving framer may compare the number of packets stored in the user overhead field to a number of actually received packets, calculate a parts per million (PPM) offset using the code number when the stored number of packets differs from the number of actually received packets, and restore at least one of an ODUk rate and an ODUk clock using the calculated PPM offset.

The receiving framer may compare the number of packets stored in the user overhead field to the number of actually received packets, calculate a PPM offset by averaging measured packet sizes when the stored number of packets equals the number of actually received packets, and restore at least one of the ODUk rate and the ODUk clock using the calculated PPM offset.

According to another aspect, there is provided a method of processing traffic in an OTN, the method including receiving an ODUk packet including, in a user overhead field, at least one of a number of packets included in an ODUk stream and a code number encoding a packet size, comparing the number of packets stored in the user overhead field to a number of actually received packets, and restoring at least one of an ODUk rate and an ODUk clock from the received ODUk packet based on a result of the comparing.

The restoring may include calculating a PPM offset using the code number when the stored number of packets differs from the number of actually received packets based on the result of the comparing, and restoring at least one of the ODUk rate and the ODUk clock using the calculated PPM offset.

The restoring may include calculating a PPM offset by averaging measured packet sizes when the stored number of packets equals the number of actually received packets based on the result of the comparing, and restoring at least one of the ODUk rate and the ODUk clock using the calculated PPM offset.

According to still another aspect, there is provided a method of processing traffic in an OTN, the method including maintaining at least one settings table to transmit OTN traffic in Interlaken to a cell fabric, and controlling, based on the settings table, an enqueuing rate at which an egress scheduler enqueues a packet in a queue of an egress traffic management block or a dequeuing rate at which the egress scheduler dequeues the packet from the queue of the egress traffic management block.

The controlling of the enqueuing rate or the dequeuing rate may include controlling the enqueuing rate or the dequeuing rate for the enqueuing rate to be greater than to equal to the dequeuing rate.

The maintaining of the settings table may include setting an Interlaken table, and maintaining the set Interlaken table. The setting of the Interlaken table may include setting, as the Interlaken table, at least one of an optical channel data unit (ODU) payload size of the OTN traffic to be transmitted through the Interlaken, a serializer/deserializer (SerDes) lane speed, and a pointer indicating a fabric switch header table, by classifying the at least one for each port when setting an Interlaken interface.

The maintaining of the settings table may include setting a fabric switch header table, and maintaining the set fabric switch header table. The setting of the fabric switch header table may include setting, as the fabric switch header table, at least one of a fabric switch header type, a customer overhead size, and a cyclic redundancy check (CRC) size to transmit the OTN traffic to the cell fabric for each port.

The maintaining of the settings table may include maintaining an Interlaken table and a fabric switch header table connected to the Interlaken table. The controlling of the enqueuing rate or the dequeuing rate may include extracting an ODU payload size from the Interlaken table, extracting a fabric switch header size based on a fabric switch header type of the fabric switch header table, calculating a control ratio using the extracted ODU payload size and the fabric switch header size and a fabric over header size, calculating an optimal egress scheduling speed based on the calculated control ratio, and controlling the enqueuing rate or the dequeuing rate based on the calculated optimal egress scheduling speed.

The calculating of the control ratio may include calculating the control ratio based on a ratio of the ODU payload size to a sum of the fabric switch header size and the fabric over header size.

The calculating of the optimal egress scheduling speed may include calculating the optimal egress scheduling speed using the calculated control ratio and a port speed set in the Interlaken interface.

According to yet another aspect, there is provided an apparatus for processing traffic in an OTN, the apparatus including a storage configured to maintain at least one settings table to transmit OTN traffic in Interlaken to a cell fabric, and a controller configured to control an enqueuing rate at which an egress scheduler enqueues a packet in a queue of an egress traffic management block or a dequeuing rate at which the egress scheduler dequeues the packet from the queue of the egress traffic management block. The controller may control the enqueuing rate or the dequeuing rate for the enqueuing rate to be greater than or equal to the dequeuing rate.

The storage may store and maintain a set Interlaken table and a set fabric switch header table.

The controller may extract an ODU payload size from the Interlaken table, extract a fabric switch header size based on a fabric switch header type of the fabric switch header table, calculate a control ratio using the extracted ODU payload size and the fabric switch header size and a fabric over header size, calculate an optimal egress scheduling speed based on the calculated control ratio, and control the enqueuing rate or the dequeuing rate based on the calculated optimal egress scheduling speed.

The controller may calculate the control ratio based on a ratio of the ODU payload size to a sum of the fabric switch header size and the fabric over header size.

The controller may calculate the optimal egress scheduling speed using the calculated control ratio and a port speed set in an Interlaken interface.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Reference will now be made in detail to embodiments of the present invention, examples of which are illustrated in the accompanying drawings, wherein like reference numerals refer to the like elements throughout. Embodiments are described below to explain the present invention by referring to the figures.

When it is determined a detailed description related to a related known function or configuration that may make the purpose of the present invention unnecessarily ambiguous in describing the present invention, the detailed description will be omitted here. Also, terms used herein are defined to appropriately describe the embodiments of the present invention and thus may be changed depending on the intent of a user or an operator, or a custom. Accordingly, the terms must be defined based on the following overall description of this specification.

Figure 1:
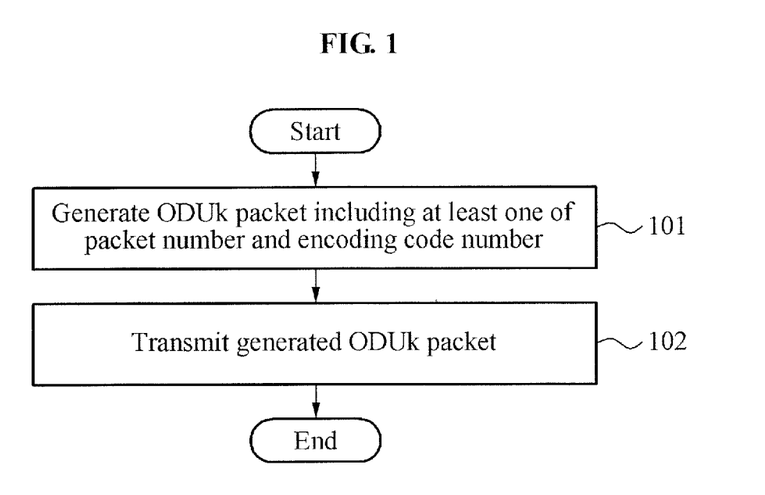
FIG. 1 is a flowchart illustrating a method of processing traffic in an optical transport network (OTN) according to an embodiment.

FIG. 1 is a flowchart illustrating a method of processing OTN traffic according to an embodiment. Hereinafter, the method of processing traffic in an OTN will be simply referred to as an OTN traffic processing method.

Referring to FIG. 1, the OTN traffic processing method includes operation 101 of generating an optical channel data unit-k (ODUk) packet and operation 102 of transmitting the generated ODUk packet to a receiving framer.

The OTN traffic processing method may include generating the ODUk packet including, in a user overhead field, at least one of a number of packets included in an ODUk stream and a code number encoding a packet size, which is interchangeably referred to as an encoding code number of a packet size.

The receiving framer may restore at least one of an ODUk rate and an ODUk clock from the transmitted ODUk packet. In one example, the receiving framer may compare the number of packets stored in the user overhead field to a number of actually received packets to restore at least one of the ODUk rate and the ODUk clock. That is, the receiving framer may verify a packet loss by comparing the number of packets stored in the user overhead field to the number of actually received packets.

When the stored number of packets differs from the number of actually received packets, for example, when an occurrence of the packet loss is verified, the receiving framer may calculate parts per million (PPM) offset using the encoding code number. In addition, the receiving framer may restore at least one of the ODUk rate and the ODUk clock using the calculated PPM offset.

Conversely, when the stored number of packets equals the number of actually received packets as a result of the comparing, the receiving framer may determine that the packet loss does not occur. In such a case, the receiving framer may calculate a PPM offset by averaging measured packet sizes, and restore at least one of the ODUk rate and the ODUk clock using the calculated PPM offset.

Figure 2:
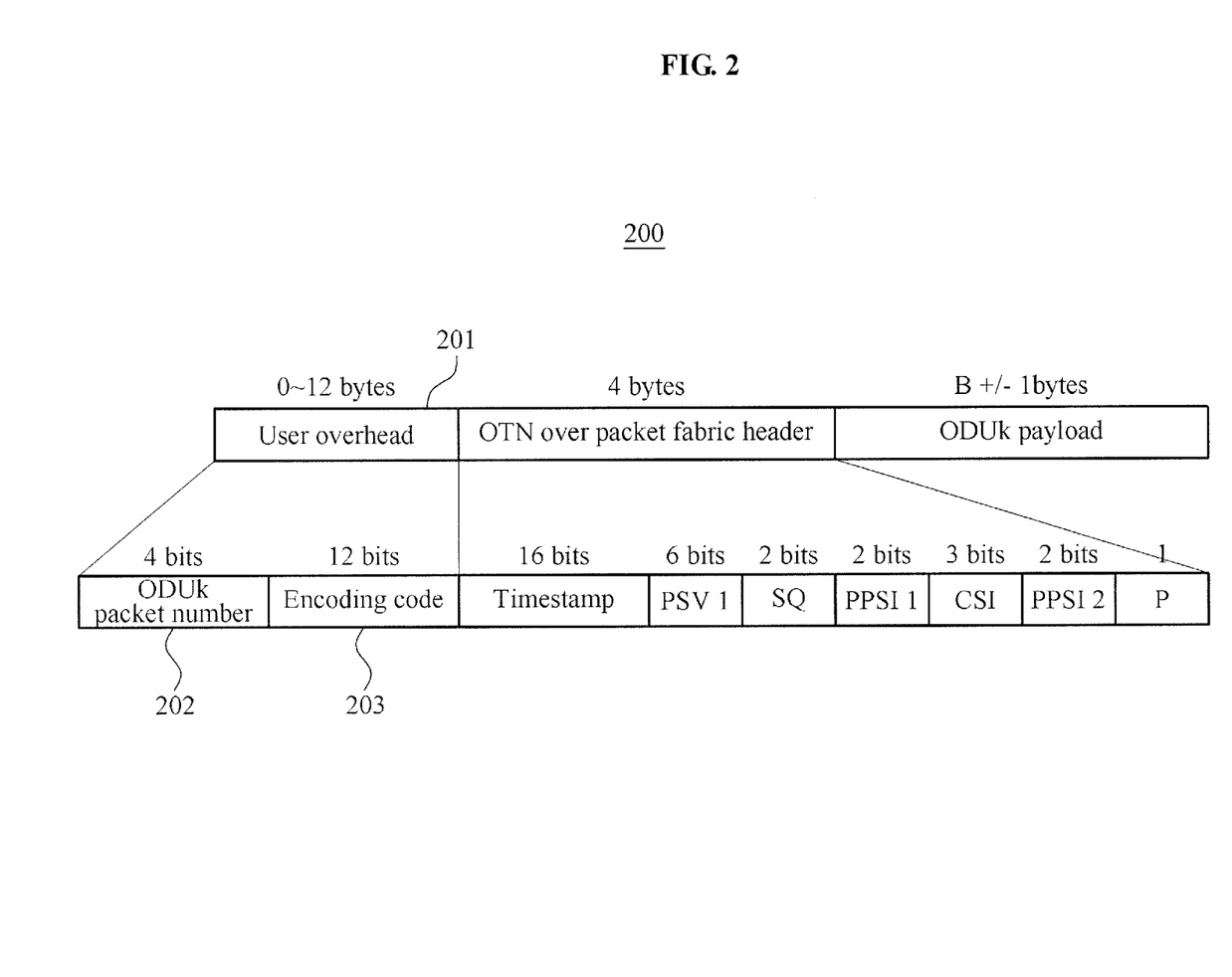
FIG. 2 is a diagram illustrating an optical channel data unit-k (ODUk) packet format according to an embodiment.

FIG. 2 is a diagram illustrating an ODUk packet format through Interlaken according to an embodiment.

According to an embodiment, an ODUk packet format may transfer OTN traffic and timing through a packet/cell type fabric.

In an OTN, transmission signals such as an optical channel payload unit-k (OPUk) (k=1, 2, 3, 4, or flex), an ODUk (k=1, 2, 3, 4, or flex), and an optical channel transport unit-k (OTUk) (k=1, 2, 3, or 4) are defined. In the OTN, an ODUflex signal, or flexible ODU signal, is defined to more flexibly and effectively accommodate a client signal while increasing transmission efficiency.

According to an embodiment, an ODUk packet may transfer an ODUk packet number and a code number encoding a packet size and thus, may improve accuracy in restoring an ODUk rate and an ODUk clock encoded as the packet size.

Referring to FIG. 2, an ODUk packet 200 includes, in a user overhead 201, a packet number 202 of packets included in a single ODUk stream and an encoding code 203 of a packet size for transferring a PPM offset, and is transferred.

When a receiving end restores an ODUk rate from the received packet size, the receiving end may verify a packet loss by comparing the packet number 202 stored in the user overhead 201 to a number of actually received packets. When a portion of the packets is lost, the receiving end may calculate a PPM offset using the encoding code 203. Thus, the receiving end may accurately restore a clock despite the packet loss.

As illustrated in FIG. 2, the ODUk packet 200 also includes a timestamp field for controlling buffering, a subjective quality (SQ) field for detecting a packet loss, a previous packet size information (PPSI) 1 and a PPSI 2 field for giving information about a size of a previous packet, and an ODUk packet payload of B+/−1 byte.

Figure 3:
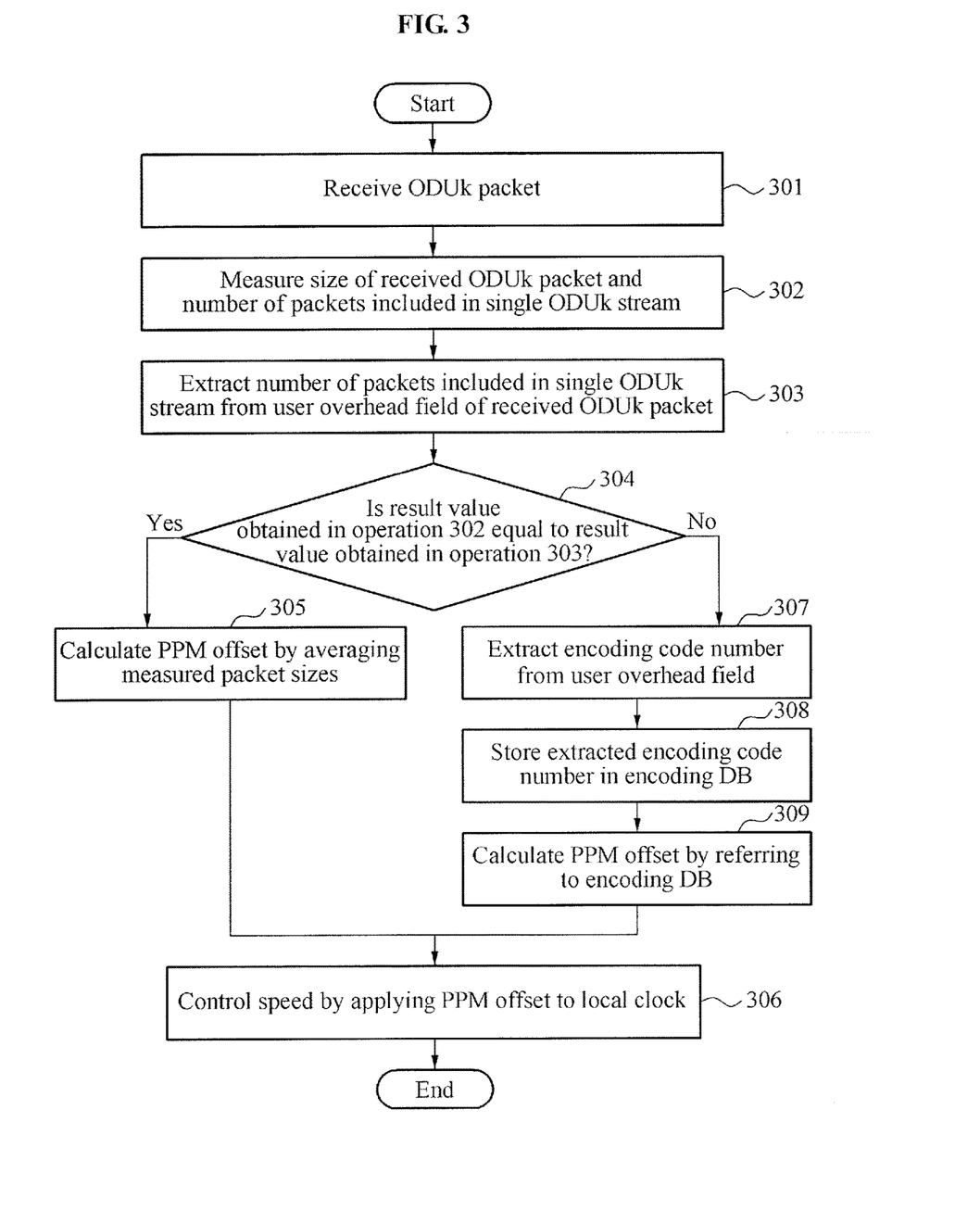
FIG. 3 is a flowchart illustrating a process of accurately restoring an ODUk packet in a framer according to an embodiment.

FIG. 3 is a flowchart illustrating a process of accurately restoring an ODUk packet in an OTN traffic processing method according to an embodiment.

Referring to FIG. 3, in operation 301, the OTN traffic processing method receives an ODUk packet.

In operation 302, the OTN traffic processing method measures a size of the received ODUk packet and a number of packets corresponding to a single ODUk stream. In operation 303, the OTN traffic processing method extracts the number of the packets corresponding to the signal ODUk stream from a user overhead field of the received ODUk packet.

In operation 304, the OTN traffic processing method compares a result value obtained from operation 302 to a result value obtained from operation 303 to verify whether a packet loss occurs, and determines whether the result values are equal to each other.

In operation 305, when the result values are determined to be equal to each other and the packet loss is not determined to occur in operation 304, the OTN traffic processing method calculates a PPM offset by averaging measured packet sizes. In operation 306, the OTN traffic processing method controls a speed by applying the calculated PPM offset to a local block.

In operation 307, when the result values are determined to differ from each other and the packet loss is determined to occur in operation 304, the OTN traffic processing method extracts an encoding code number from the user overhead field. In operation 308, the OTN traffic processing method stores the extracted encoding code number in an encoding database (DB). In operation 309, the OTN traffic processing method calculates a PPM offset by referring to the encoding DB. Subsequently, in operation 306, the OTN traffic processing method controls the speed by applying the PPM offset to the local block.

According to an embodiment, a packet number and a code number encoding a packet size may be inserted in an ODUk packet format and be transferred together and thus, accuracy in restoring an ODUk rate and clock encoded as the packet size may be improved despite a packet loss.

Figure 4:
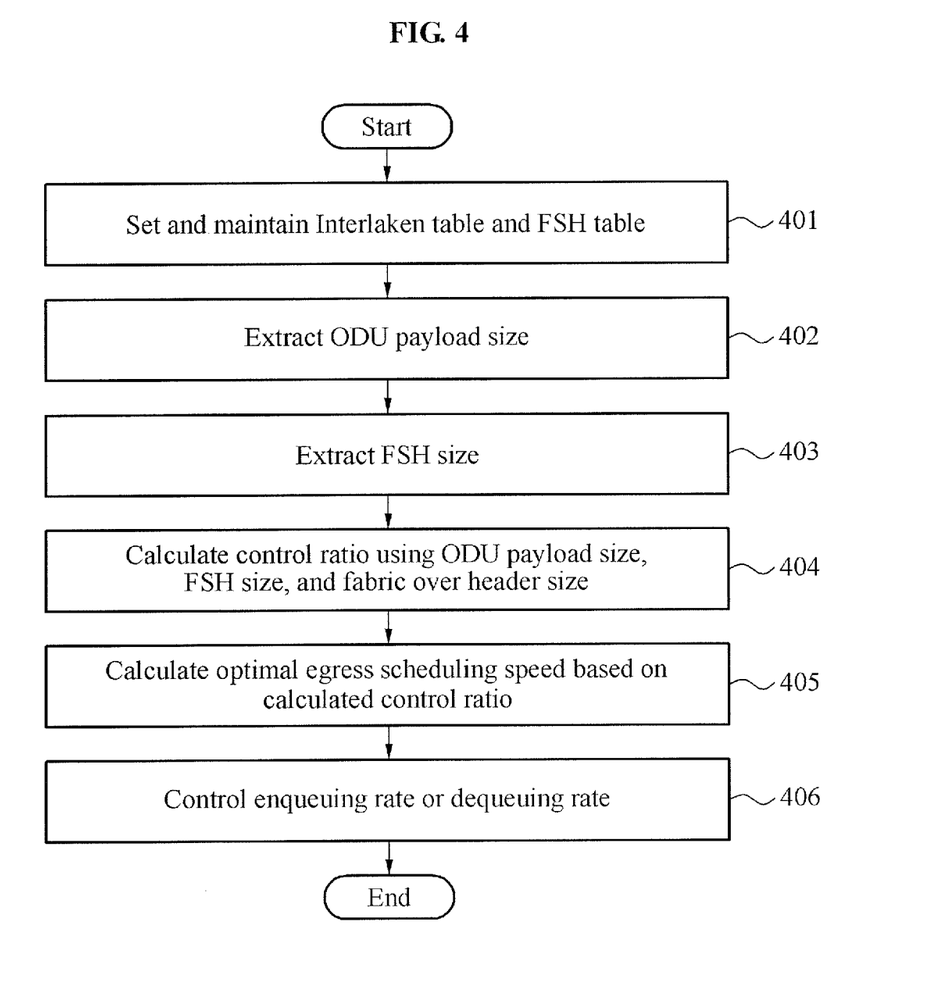
FIG. 4 is a flowchart illustrating a method of processing OTN traffic in a fabric access point (FAP) according to another embodiment.

FIG. 4 is a flowchart illustrating an OTN traffic processing method in the FAP according to another embodiment.

According to an embodiment, the OTN traffic processing method may prevent a loss from an egress traffic management block because a dequeuing rate of the egress traffic management block is lower than an enqueuing rate of the egress traffic management block.

Referring to FIG. 4, in operation 401, the OTN traffic processing method sets an Interlaken table and a fabric switch header (FSH) table and maintains the set tables.

The OTN traffic processing method may set, as the Interlaken table, at least one of an optical channel data unit (ODU) payload size of OTN traffic, a serializer/deserializer (SerDes) lane speed, and a pointer indicating the FSH table, by classifying the at least one for each port when setting an Interlaken interface. In addition, the OTN traffic processing method may set, as the FSH table, at least one of an FSH type, a customer overhead size, and a cyclic redundancy check (CRC) size to transmit the OTN traffic to a cell fabric for each port.

The OTN traffic processing method may then control, based on the set tables, an enqueuing rate at which an egress scheduler enqueues a packet in a queue of an egress traffic management block or a dequeuing rate at which the egress scheduler dequeues the packet from the queue of the egress traffic management block. For example, the OTN traffic processing method may control the enqueuing rate or the dequeuing rate for the enqueuing rate to be greater than or equal to the dequeuing rate.

In operation 402, the OTN traffic processing method extracts the ODU payload size from the Interlaken table to control the enqueuing rate or the dequeuing rate.

In operation 403, the OTN traffic processing method extracts the FSH size based on the FSH type of the FSH table. In operation 404, the OTN traffic processing method calculates a control ratio using the extracted ODU payload size and the FSH size, and a fabric over header size.

For example, the OTN traffic processing method may calculate the control ratio based on a ratio of the ODU payload size to a sum of the FSH size and the fabric over header size.

In operation 405, the OTN traffic processing method calculates an optimal egress scheduling speed based on the calculated control ratio. In operation 406, the OTN traffic processing method controls the enqueuing rate or the dequeuing rate based on the calculated optimal egress scheduling speed. For example, the OTN traffic processing method may calculate the optimal egress scheduling speed using the calculated control ratio and a port speed set in the Interlaken interface.

Figure 5:
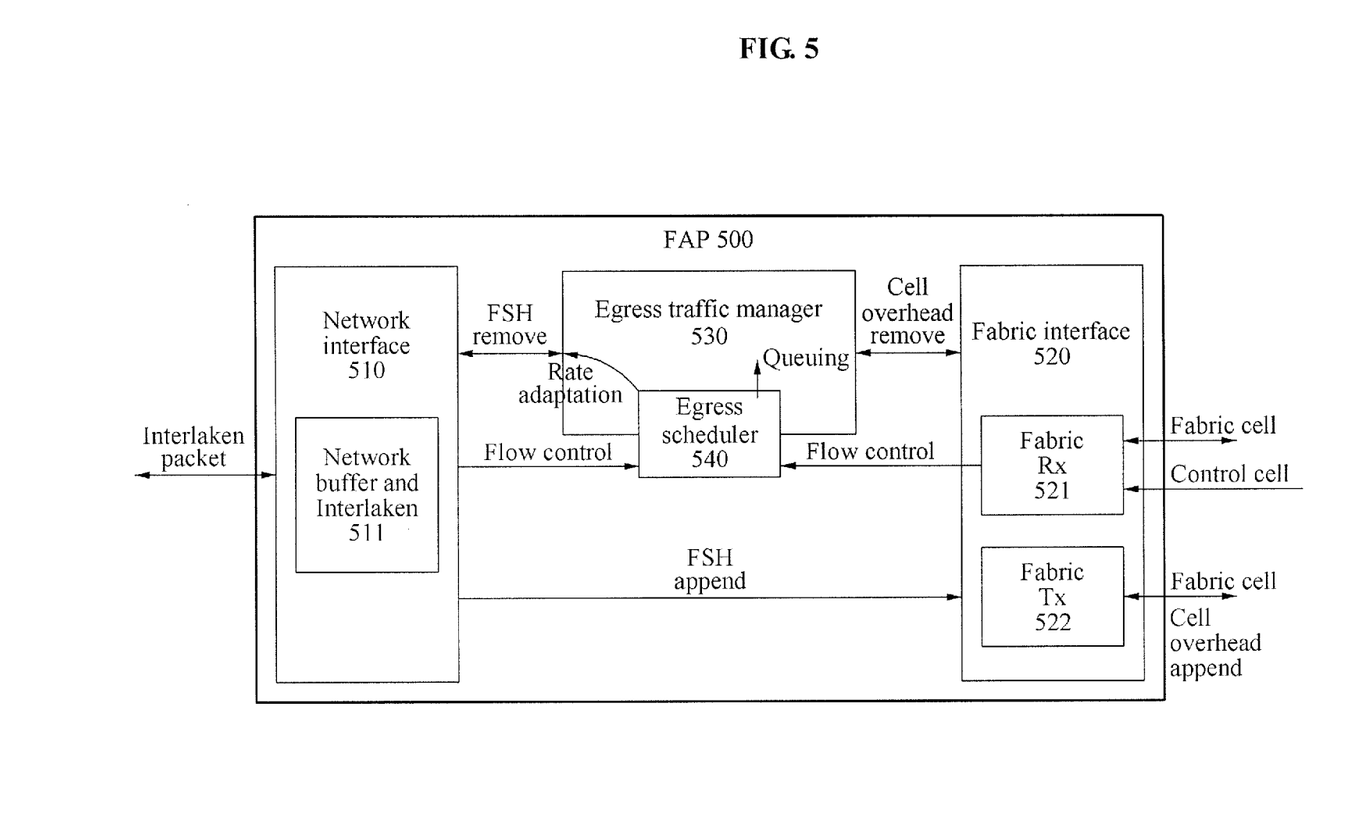
FIG. 5 is a diagram illustrating an overhead processing method according to an embodiment.

FIG. 5 is a diagram illustrating an overhead processing method according to an embodiment.

According to an embodiment, an OTN traffic processing method may operate in an egress scheduler 540 of the FAP 500.

Referring to FIG. 5, an OTN processor divides an ODUk stream into Interlaken packets and transmits the packets to the FAP 500. The FAP 500 divides a packet into cell units and performs switching through a cell/fabric. The cell/fabric performs switching between line cards using an FSH-based cell header.

The FAP 500 includes a network interface 510, a fabric interface 520, an egress traffic manager 530, and the egress scheduler 540.

The network interface 510 transmits a packet through an Interlaken interface 511, and the fabric interface 520 transmits the packet to a cell/fabric switch. Between the network interface 510 and the fabric interface 520, the egress traffic manager 530 manages traffic in an ingress and egress direction.

The egress scheduler 540 implements the OTN traffic processing method, and controls a speed of storing a packet in an egress traffic queue and a speed of sending a packet to a network interface block through a flow control packet.

In general, since an enqueuing rate at which the egress traffic manager 530 enqueues a packet in a queue differs from a dequeuing rate at which the egress traffic manager 530 dequeues the packet from the queue, a loss of OTN traffic may occur. Such a packet includes ODUk information and an ODUk clock is not restored from a lost ODUk packet and thus, a fault such as an out of frame (OOF) and a loss of frame (LOF) of the OTN traffic may occur.

For example, when the Interlaken interface 511 includes 16 SerDes lanes with a SerDes lane speed or rate of 10.3125 gigabits per second (Gbps), a packet may have a speed of 11.55 Gbps as an FSH is inserted through the egress traffic manager 530.

In addition, a fabric over header may be inserted in the packet and thus, the packet may be transferred to a multi-level integrated fabric switch at a speed of 12.27 Gbps. When a fabric cell is received from the multilevel integrated fabric switch at the speed of 12.27 Gbps, the packet may remove the fabric over header from the fabric interface 520 and the speed may become 11.55 Gbps, and remove the FSH and the speed may become 10.3125 Gbps at a time of transmission to the network interface 510.

A speed or a rate at which the egress traffic manager 530 queues a packet may be controlled by a flow control to be transferred from the fabric interface 520 and thus, controlled to be 12.27 Gbps which is stored in the egress traffic queue. However, a speed at which the packet is dequeued from the egress traffic queue of the egress traffic manager 530 to the network interface 510 may be controlled by a flow control to be transferred from the network interface 510 and thus, controlled to be 10.3125. Thus, a speed of actual transmission to the Interlaken with the FSH removed may be 9.28 Gbps.

The egress scheduler 540 may prevent a potential fault by implementing the OTN traffic processing method.

That is, since the dequeuing rate of the egress traffic manager 530 is less than the enqueuing rate of the egress traffic manager 530, the egress scheduler 540 may prevent a packet loss that may occur.

According to an embodiment, an apparatus for processing traffic in an OTN, which will be hereinafter referred to as an OTN traffic processing apparatus, may be included in a component of the egress scheduler 540. A method of preventing a packet loss through the egress scheduler 540 using the OTN traffic processing apparatus will be described in detail with reference to FIG. 6.

Figure 6:
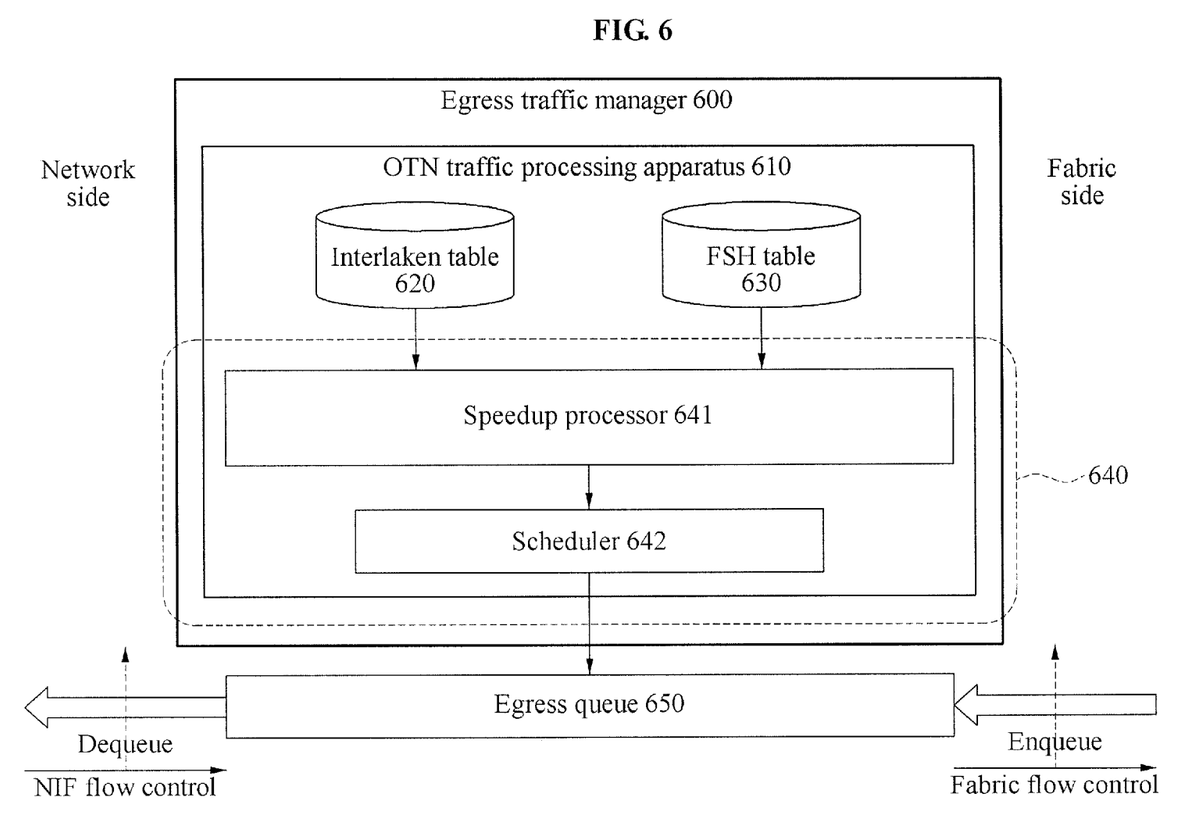
FIG. 6 is a diagram illustrating an apparatus for processing OTN traffic in the FAP according to an embodiment.

FIG. 6 is a diagram illustrating an OTN traffic processing apparatus 610 according to an embodiment.

Referring to FIG. 6, an egress traffic manager 600 includes the OTN traffic processing apparatus 610.

The OTN traffic processing apparatus 610 includes a storage configured to maintain at least one settings table to transmit OTN traffic in Interlaken to a cell fabric, and a controller 640 configured to control, based on the settings table, an enqueuing rate at which an egress scheduler enqueues a packet in a queue of an egress traffic management block or a dequeuing rate at which the egress scheduler dequeues the packet from the queue of the egress traffic management block.

In one example, as illustrated in FIG. 6, the storage includes an Interlaken table 620 and an FSH table 630. The controller 640 includes a speedup processor 641 and a scheduler 642.

The controller 640 may extract an ODU payload size from the Interlaken table 620 through the speedup processor 641, and extract an FSH size based on an FSH type of the FSH table 630 connected to the Interlaken table 620. The speedup processor 641 may calculate a control ratio using the extracted ODU payload size and the FSH size, and a fabric over header size.

Here, the speedup processor 641 may calculate the control ratio using Equation 1.

[Equation 1]

$$\text{Control ratio} = (\text{FSH size} + \text{fabric over header size}) / \text{ODU payload size} \quad (1)$$

The speedup processor 641 may calculate an optimal egress scheduling speed using the calculated control ratio and a port speed set in an Interlaken interface.

The scheduler 642 of the controller 640 may control the enqueuing rate and the dequeuing rate of the egress traffic manager 600 based on the optimal egress scheduling speed.

As described herein, a loss of OTN traffic that may occur in a cell fabric-based optical-circuit-packet converged transport system may be prevented because a scheduling speed of a traffic manager may be adjusted based on an ODU payload size of the OTN traffic. Further, a transmission function and performance of the OTN traffic may be improved in a cell fabric-based packet-circuit converged transport system.

According to example embodiments, transmitting a code number encoding a packet size along with a number of packets in an ODUk in an ODUk paket format may enable an increase in accuracy in restoring an ODUk rate and clock despite a packet loss because the ODUk is encoded as the packet size.

According to example embodiments, controlling a scheduling speed of a traffic manager based on an ODU payload size of OTN traffic may enable prevention of a loss of the OTN traffic that may occur in a cell fabric-based optical-circuit-packet converged transport system.

According to example embodiments, in a cell fabric-based packet-circuit converged transport system, a transmission function and performance of OTN traffic may be improved.

The above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tapes; optical media such as CD ROMs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few example embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of processing traffic in an optical transport network (OTN), the method comprising:

maintaining at least one settings table to transmit OTN traffic in Interlaken to a cell fabric;

calculating a control ratio based on an optical channel data unit (ODU) payload size and a sum of a fabric switch header size and a fabric over header size using the at least one settings table; and controlling, based on the control ratio, an enqueuing rate at which an egress scheduler enqueues a packet in a queue of an egress traffic management block and a dequeuing rate at which the egress scheduler dequeues the packet from the queue of the egress traffic management block, wherein the maintaining of the settings table comprises:

maintaining an Interlaken table and a fabric switch header table connected to the Interlaken table, and the controlling of the enqueuing rate and the dequeuing rate comprises:

extracting the ODU payload size from the Interlaken table;

extracting the fabric switch header size based on a fabric switch header type of the fabric switch header table;

calculating a control ratio using the ODU payload size and the fabric switch header size, and the fabric over header size;

calculating an optimal egress scheduling speed based on the calculated control ratio; and controlling the enqueuing rate and the dequeuing rate based on the calculated optimal egress scheduling speed.

2. The method of claim 1, wherein the controlling of the enqueuing rate and the dequeuing rate comprises controlling the enqueuing rate and the dequeuing rate for the enqueuing rate to be greater than or equal to the dequeuing rate.

3. The method of claim 1, wherein the maintaining of the settings table comprises:

setting an Interlaken table; and maintaining the set Interlaken table, and wherein the setting of the Interlaken table comprises:

setting, as the Interlaken table, at least one of the ODU payload size of the OTN traffic to be transmitted through the Interlaken, a serializer/deserializer (SerDes) lane speed, and a pointer indicating a fabric switch header table, by classifying the at least one for each port when setting an Interlaken interface.

4. The method of claim 1, wherein the maintaining of the settings table comprises:

setting a fabric switch header table; and maintaining the set fabric switch header table, and wherein the setting of the fabric switch header table comprises:

setting, as the fabric switch header table, at least one of a fabric switch header type, a customer overhead size, and a cyclic redundancy check (CRC) size to transmit the OTN traffic to the cell fabric for each port.

5. The method of claim 1, wherein the calculating of the control ratio comprises:

calculating the control ratio based on a ratio of the ODU payload size to a sum of the fabric switch header size and the fabric over header size.

6. The method of claim 1, wherein the calculating of the optimal egress scheduling speed comprises:

calculating the optimal egress scheduling speed using the calculated control ratio and a port speed set in an Interlaken interface.

7. An apparatus for processing traffic in an optical transport network (OTN), the apparatus comprising:

a storage configured to maintain at least one settings table to transmit OTN traffic in Interlaken to a cell fabric; and a controller configured to control an enqueuing rate at which an egress scheduler enqueues a packet in a queue of an egress traffic management block and a dequeuing rate at which the egress scheduler dequeues the packet from the queue of the egress traffic management block, wherein the controller is configured to calculate a control ratio based on a ODU (optical channel data unit) payload size and a sum of a fabric switch header size and a fabric over header size using the at least one settings table, wherein the controller is configured to extract the ODU payload size from the at least one setting table, extract the fabric switch header size based on a fabric switch header type of the fabric switch header table, calculate the control ratio using the ODU payload size and the fabric switch header size and the fabric over header size, calculate an optimal egress scheduling speed based on the calculated control ratio, and wherein the controller is configured to control the enqueuing rate and the dequeuing rate for the enqueuing rate to be greater than or equal to the dequeuing rate based on the calculated control ratio.

8. The apparatus of claim 7, wherein the storage is configured to store and maintain a set Interlaken table and a set fabric switch header table.

9. The apparatus of claim 8, wherein the controller is configured to calculate the control ratio based on a ratio of the ODU payload size to a sum of the fabric switch header size and the fabric over header size.

10. The apparatus of claim 8, wherein the controller is configured to calculate the optimal egress scheduling speed using the calculated control ratio and a port speed set in an Interlaken interface.

* * * * *